(12) United States Patent
Into

(10) Patent No.: US 9,924,132 B2
(45) Date of Patent: Mar. 20, 2018

(54) VIDEO DATA PROCESSING DEVICE AND VIDEO DATA PROCESSING METHOD

(71) Applicant: SONY CORPORATION, Tokyo (JP)

(72) Inventor: Shozo Into, Kanagawa (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 15/505,708

(22) PCT Filed: Aug. 31, 2015

(86) PCT No.: PCT/JP2015/074588
§ 371 (c)(1),
(2) Date: Feb. 22, 2017

(87) PCT Pub. No.: WO2016/035728
PCT Pub. Date: Mar. 10, 2016

(65) Prior Publication Data
US 2017/0257597 A1    Sep. 7, 2017

(30) Foreign Application Priority Data

Sep. 4, 2014 (JP) ................. 2014-179855

(51) Int. Cl.
*H04N 7/01* (2006.01)
*H04N 5/268* (2006.01)
*H04N 5/265* (2006.01)

(52) U.S. Cl.
CPC .......... *H04N 7/0122* (2013.01); *H04N 5/265* (2013.01); *H04N 7/0125* (2013.01)

(58) Field of Classification Search
CPC ........ H04N 7/012; H04N 7/0127; H04N 7/01; H04N 5/265; H04N 5/268; H04N 7/0125; H04N 9/74; H04N 9/76
USPC ....... 348/441, 445, 458, 459, 705, 706, 584, 348/588, 591, 590, 593-595, 598, 599
See application file for complete search history.

(56) References Cited

U.S. PATENT DOCUMENTS

| 5,995,505 A * | 11/1999 | Nakasaka | H04N 5/268 348/E5.022 |
| 2009/0244393 A1* | 10/2009 | Mizutani | H04N 5/268 348/705 |
| 2013/0315473 A1* | 11/2013 | Takahashi | G06T 15/205 382/154 |

FOREIGN PATENT DOCUMENTS

| JP | 10-290418 A | 10/1998 |
| JP | 2007-049734 A | 2/2007 |
| JP | 2008-131380 A | 6/2008 |
| JP | 2009-253385 A | 10/2009 |
| JP | 2013-247582 A | 12/2013 |

* cited by examiner

Primary Examiner — Sherrie Hsia
(74) Attorney, Agent, or Firm — Chip Law Group

(57) ABSTRACT

Even when mixing video data whose video formats are different, appropriate mix processing can be performed. Output video data is obtained by performing mix processing such as dissolve and wipe on first video data and second video data. Before performing the mix processing, a format of the first video data and the second video data is made the same as a video format handled by the mixing unit. Further, after performing the mix processing, a format of the output video data is made the same as an output video format.

12 Claims, 22 Drawing Sheets

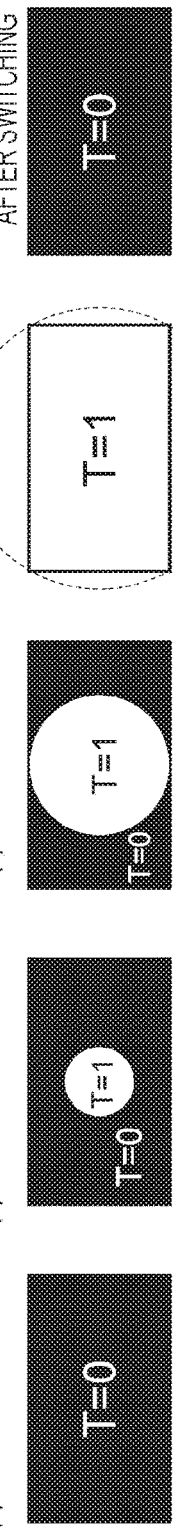

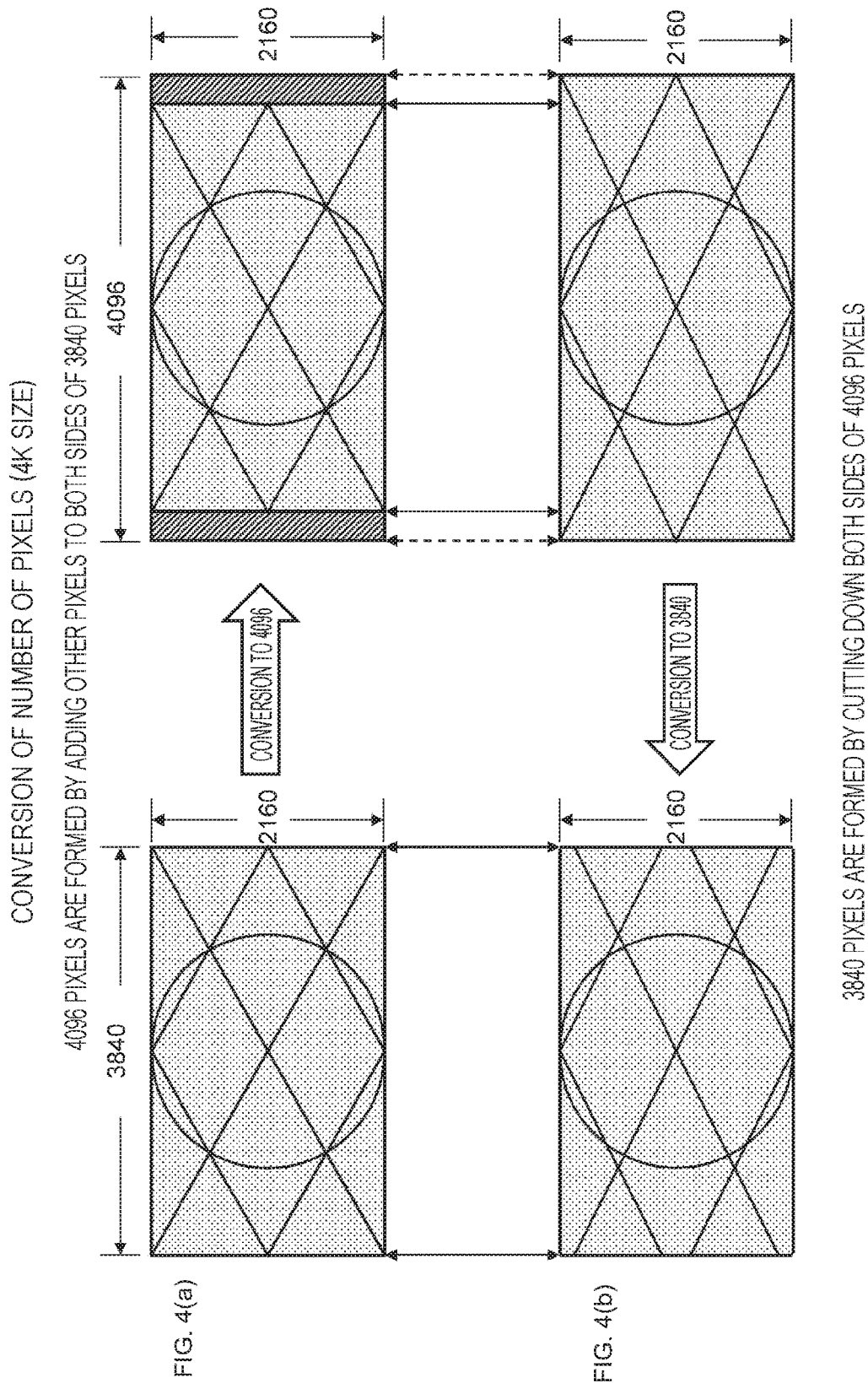

TABLE (EXAMPLE)

| Input # | Size |
|---|---|
| 1 | 3840 |
| 2 | 3840 |
| 3 | 4096 |
| 4 | 4096 |
| 5 | No Signal |
| 6 | Unknown |
| 7 | SD |

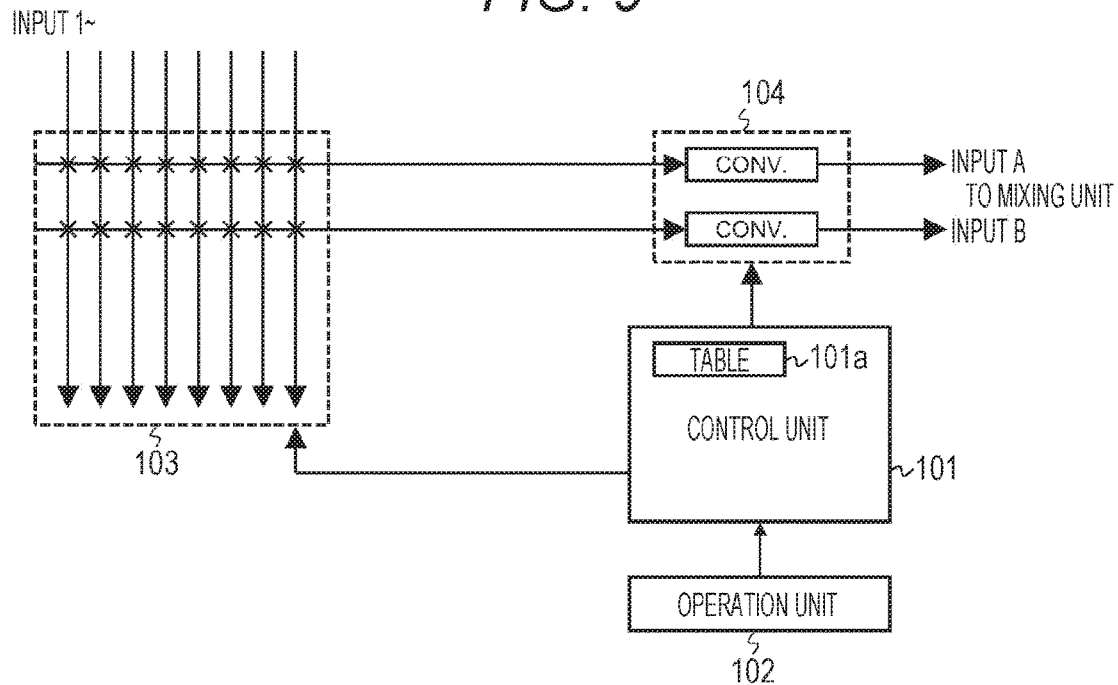

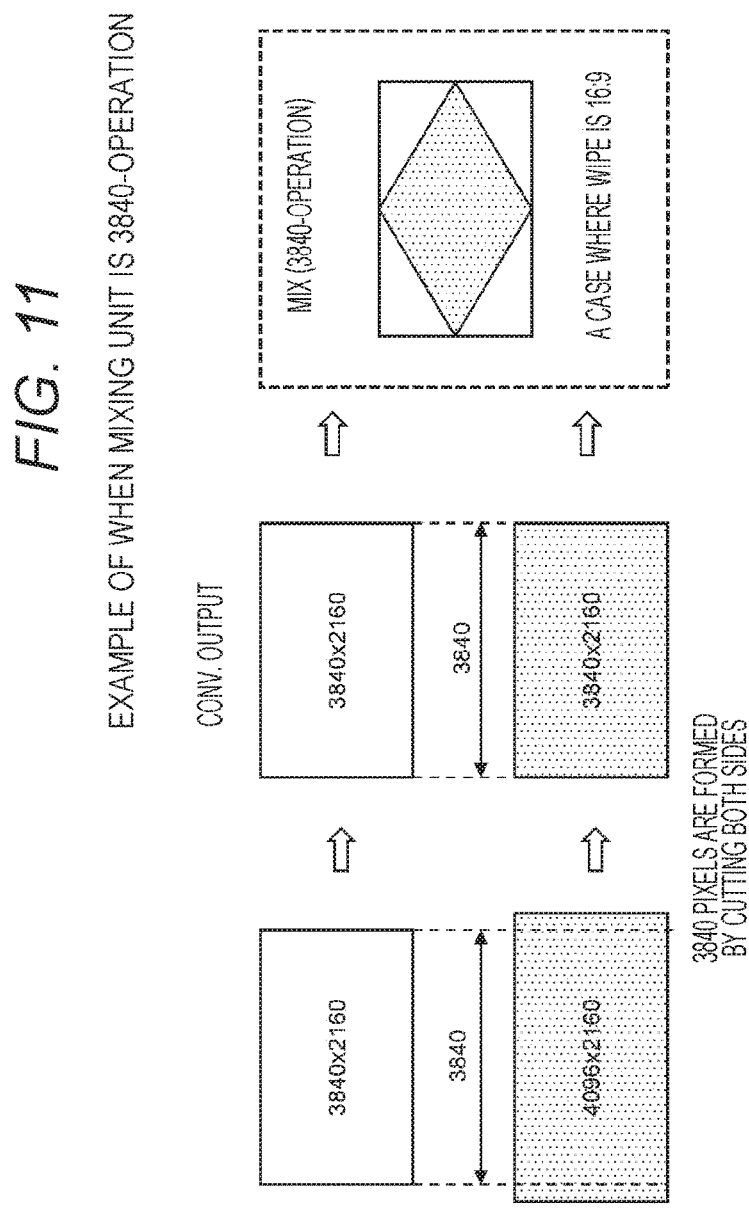

OVERVIEW OF CROSS-POINT AND CONTROL OF MIXING DURING TRANSITION

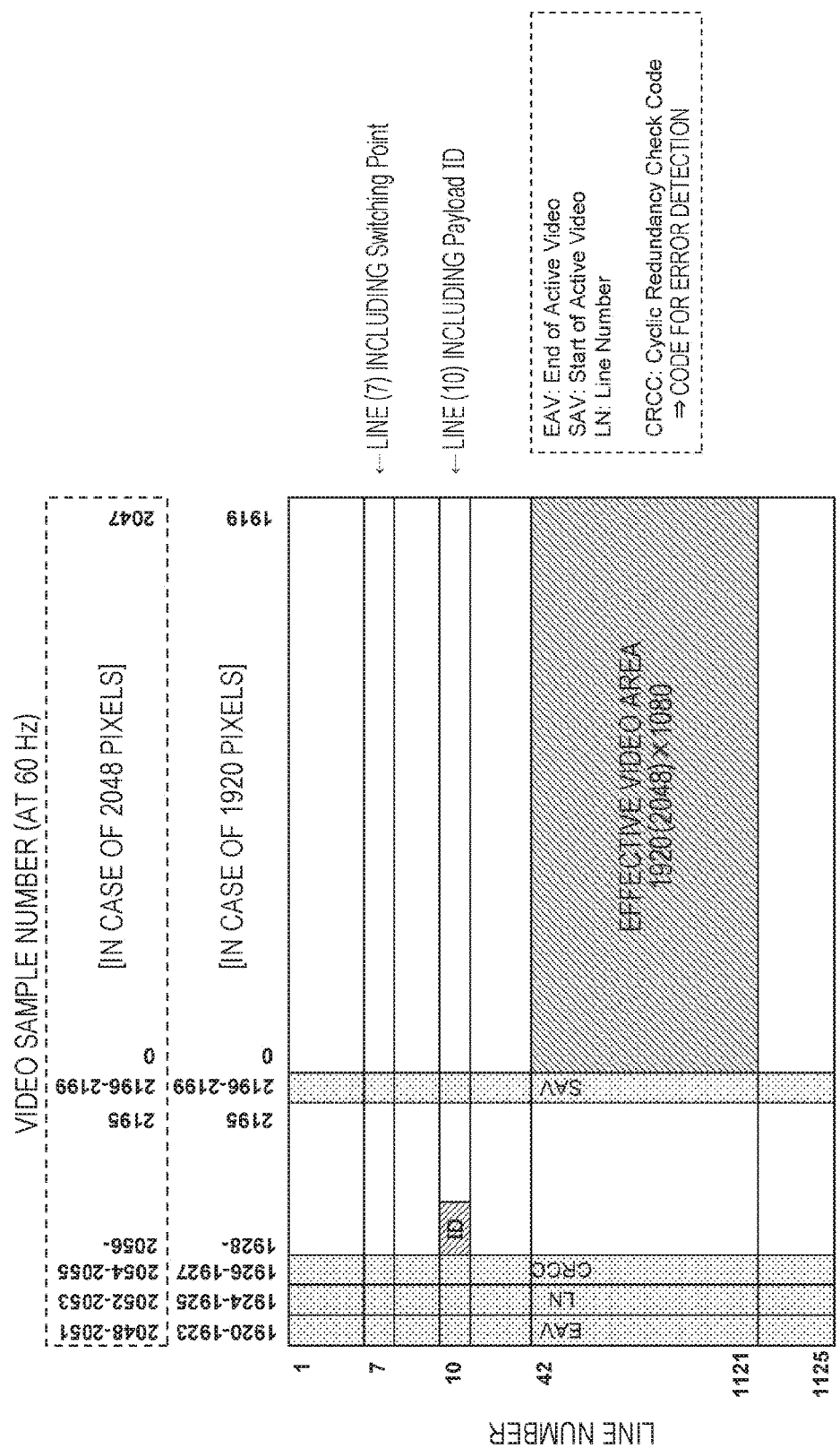

VIDEO DATA PROCESSING DEVICE AND VIDEO DATA PROCESSING METHOD

CROSS REFERENCE TO RELATED APPLICATIONS

This application is a U.S. National Phase of International Patent Application No PCT/JP2015/074588 filed on Aug. 31, 2015, which claims priority benefit of Japanese Patent Application No. JP 2014-179855 filed in the Japan Patent Office on Sep. 4, 2014. Each of the above-referenced applications is hereby incorporated herein by reference in its entirety.

TECHNICAL FIELD

The present technology relates to a video data processing device and a video data processing method, and specifically relates to a video data processing device and a video data processing method that mix video data by wipe and the like.

BACKGROUND ART

An effect switcher including a mixing unit of video data has been known (for example, see Patent Document 1).

CITATION LIST

Patent Document

Patent Document 1: Japanese Patent Application Laid-Open No. 2008-131380

SUMMARY OF THE INVENTION

Problems to be Solved by the Invention

An object of the present technology is to enable appropriate mix processing even when mixing video data whose video formats are different.

Solutions to Problems

A concept of the present technology is
a video data processing device including
a video data input unit that inputs first video data and second video data,
a mixing unit that mixes the first video data and the second video data inputted by the video data input unit and obtains output video data,
a first video format conversion unit that is arranged between the video data input unit and the mixing unit and that makes a video format of the first video data and the second video data inputted into the mixing unit the same as a video format handled by the mixing unit, and
a second video format conversion unit that is arranged on an output side of the mixing unit and that makes a video format of the output video data obtained by the mixing unit the same as an output video format.

In the present technology, the first video data and the second video data are inputted by the video data input unit. The first video data and the second video data inputted by the video data input unit are mixed by the mixing unit and the output video data is obtained. The mixing is performed by, for example, wipe and dissolve.

The video format of the first video data and the second video data inputted into the mixing unit is made the same as the video format handled by the mixing unit by the first video format conversion unit. Further, the video format of the output video data obtained by the mixing unit is made the same as the output video format by the second video format conversion unit.

As described above, in the present technology, when the first video data and the second video data are mixed in the mixing unit, the video format of first video data and the second video data is made the same as the video format handled by the mixing unit. Therefore, even when mixing video data whose video formats are different, it is possible to perform appropriate mix processing.

In addition, in the present technology, for example, it is possible that the first video data and the second video data are respectively video data of a first video format where the number of vertical pixels is a first value and the number of horizontal pixels is a second value or a second video format where the number of vertical pixels is the first value and the number of horizontal pixels is a third value, the mixing unit handles the first video format or the second video format, and the output video format is the first video format or the second video format.

In this case, for example, it is possible that the first value is 2160, the second value is 3840, and the third value is 4096. Further, in this case, the video data may be four-divided 4K mode video data. Here, the four-divided 4K mode is, for example, a Square Division standard or a 2-Sample Interleave Division standard.

Further, in the present technology, for example, it is possible that the mixing unit mixes the first video data and the second video data by wipe. In this case, for example, when the mixing unit handles the first video format, it is possible that wipe control transits within a range of 3840-size having a shape of 16:9. Further, in this case, when the mixing unit handles the second video format, it is possible that the wipe control transits within a range of 3840-size having a shape of 16:9, transits within a range of 4096-size having a shape of 16:9, or transits within a range of 4096-size having a shape of 17:9.

Further, in the present technology, for example, it is possible to further include a control unit that controls conversion operation on the first video data and the second video data in the first video format conversion unit on the basis of video format information of each of the first video data and the second video data. Thereby, a video format of each of the first video data and the second video data is appropriately converted so as to match the video format handled by the mixing unit in the first video format conversion unit.

In this case, for example, it is possible that the control unit acquires the video format information of each of the first video data and the second video data from a detection unit that detects the video format of each of the first video data and the second video data. Further, in this case, it is possible that the video data input unit has a cross-point unit that selectively extracts the first video data and the second video data from a plurality of video data and the control unit acquires the video format information of each of the first video data and the second video data from a table that has video format information of each of the plurality of video data.

Effects of the Invention

According to the present technology, even when mixing video data whose video formats are different, it is possible to perform appropriate mix processing. In addition, the effect described here is not necessarily limited and the effect may be any of the effects described in the present disclosure.

BRIEF DESCRIPTION OF DRAWINGS

FIGS. 3(a) and 3(b) are diagrams for explaining a transition signal T in a case of dissolve and in a case of wipe.

FIGS. 4(a) and 4(b) are diagrams for explaining conversion processing of video format between a first video format (3840 pixels) and a second video format (4096 pixels).

FIG. 9 is a diagram for explaining a table generation example in a case of obtaining the video format information of two video data (input A and input B) extracted at the cross-point unit from a table.

FIG. 10 is a diagram showing another example of the table.

FIG. 11 is a diagram showing an example of video format conversion in a case in which the mixing unit mixing unit is 3840-operation.

FIG. 25 is a diagram showing a basic structure of signals of 1125 lines used in sub images.

MODE FOR CARRYING OUT THE INVENTION

Hereinafter, a mode for carrying out the invention (hereinafter referred to as an "embodiment") will be described. Note that the order of description is as follows.
1. Embodiment
2. Modified Example 1. Embodiment

[Video Data Processing Device]

Figure 1:
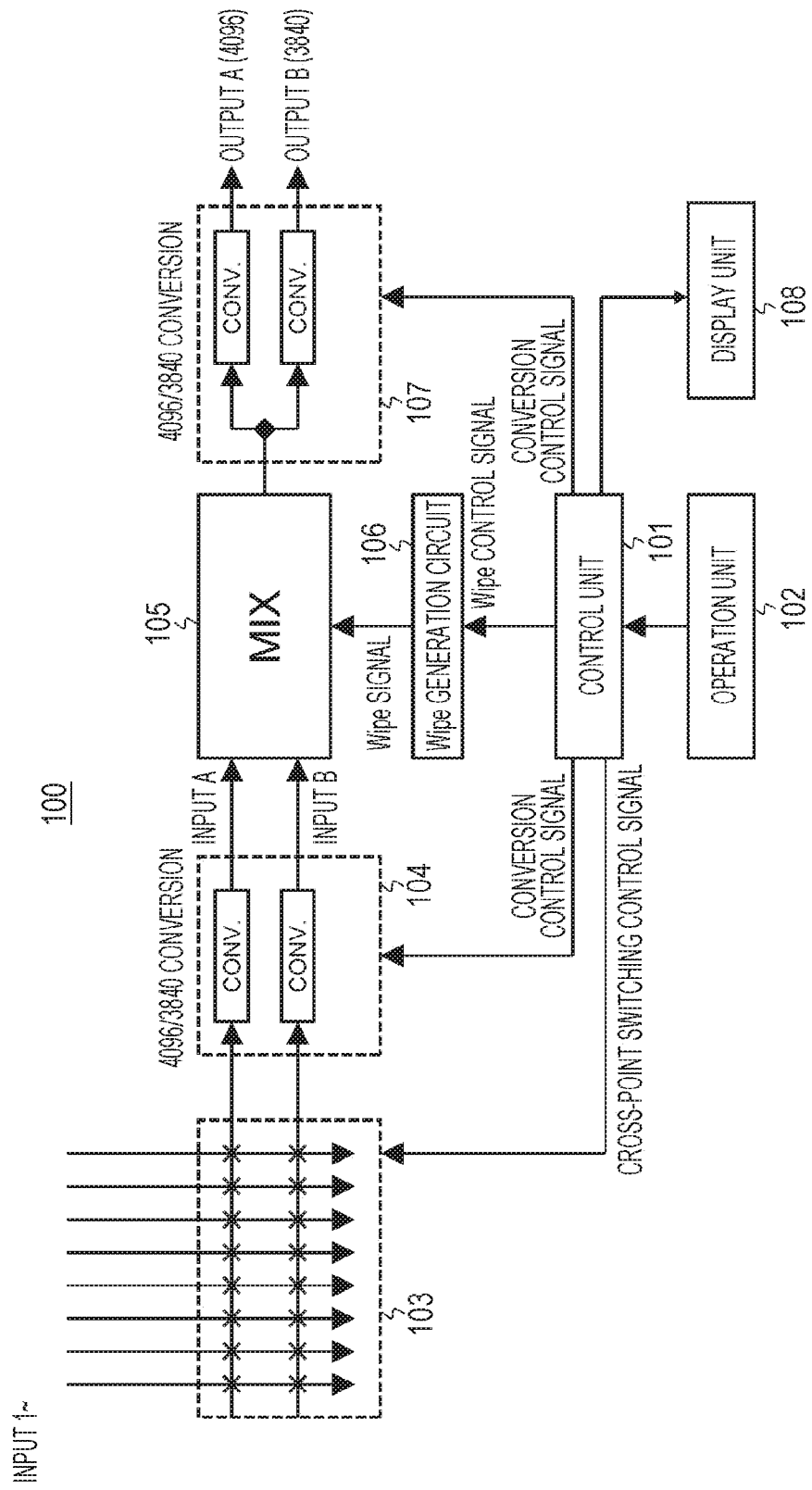
FIG. 1 is a block diagram showing a configuration example of a video data processing device.

FIG. 1 shows a configuration example of a video data processing device 100 as an embodiment. The video data processing device 100 includes a control unit 101, an operation unit 102, a cross-point unit 103, a video format conversion unit 104, a mixing unit 105, a wipe generation circuit 106, a video format conversion unit 107, and a display unit 108.

The control unit 101 controls operation of each unit of the video data processing device 100. For example, the control unit 101 supplies a cross-point control signal to the cross-point unit 103, supplies a conversion control signal to the video format conversion units 104 and 107, and supplies a wipe control signal to the wipe generation circuit 106. The operation unit 102 is connected to the control unit 101 and is a control panel or the like for a user to perform operation input. The display unit 108 is connected to the control unit 101. The display unit 108 displays a status of the video data processing device 100 and further displays a GUI for convenience of setting when a user performs a setting operation of a video format of the mixing unit 105, an output video format, and the like.

The cross-point unit 103 selectively extracts two video data to be mixed from a plurality of video data. Each of the plurality of video data is 4K video data. The 4K video data includes video data of a first video format where the number of vertical pixels is 2160 and the number of horizontal pixels is 3840 or video data of a second video format where the number of vertical pixels is 2160 and the number of horizontal pixels is 4096.

The mixing unit 105 mixes two video data (mix inputs A and B) extracted by the cross-point unit 103 and obtains output video data. The mixing includes, for example, mixing by wipe, dissolve, or the like.

Figure 2:
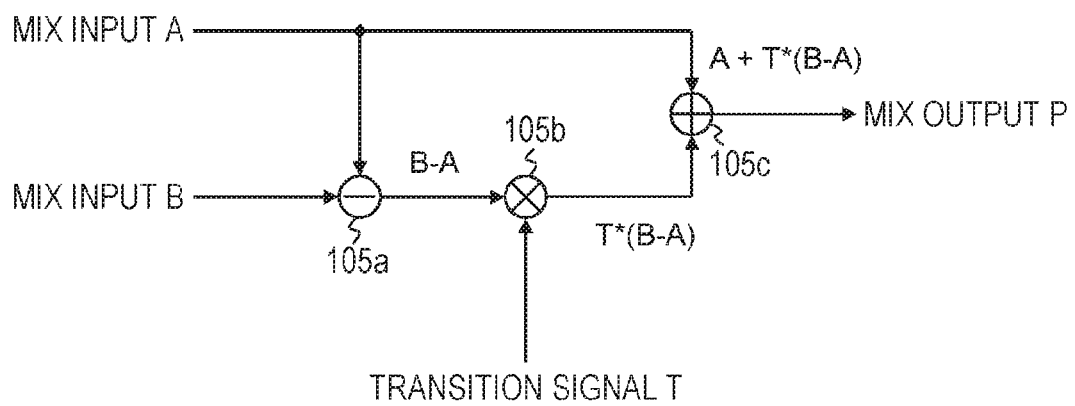
FIG. 2 is a diagram schematically showing a configuration of a mixing unit.

FIG. 2 schematically shows a configuration of the mixing unit 105. The mixing unit 105 has a subtracter 105a, a multiplier 105b, and an adder 105c. The subtracter 105a subtracts the mix input A from the mix input B and outputs a subtraction output "B−A". The multiplier 105b multiplies the subtraction output "B−A" by a transition signal T and outputs a multiplication output "T*(B−A)". The adder 105c adds the multiplication output "T*(B−A)" to the mix input A and obtains a mix output P.

The mix output P is represented by the following formula (1).

$$P = A + T*(B-A) \qquad (1)$$

The transition signal T is a signal having a value of 0 to 1 that varies with time. When T=0, P=A, and when T=1, P=B.

In the case of dissolve, as shown in FIG. 3(a), the transition signal T has a uniform value in a screen. In the case of wipe, as shown in FIG. 3(b), a shape of a portion having a value of 1 varies with time. The example shown in FIG. 3(b) shows an example of circular wipe.

In this embodiment, it is assumed that mixing by wipe is performed in the mixing unit 105. The video format handled by the mixing unit 105 is the first video format or the second video format. For example, the video format handled by the mixing unit 105 is set by the control unit 101 on the basis of a specification input by a user from the operation unit 102.

Let us return to FIG. 1. The video format conversion unit 104 is arranged between the cross-point unit 103 and the mixing unit 105. The video format conversion unit 104 makes the video format of input video data extracted by the cross-point unit 103 the same as the video format handled by the mixing unit 105. Here, when the video format handled by the mixing unit 105 and the video format of input video data are the same, no conversion processing is performed on the input video data and the input video data is transmitted without change to the mixing unit 105.

Further, when the video format handled by the mixing unit 105 is the second video format and the video format of input video data is the first video format, the video format of input video data is converted from the first video format to the second video format. In this case, as shown in FIG. 4(a), 4096 pixels are formed by adding other pixels to both sides of the 3840 pixels in the horizontal direction.

Further, when the video format handled by the mixing unit 105 is the first video format and the video format of input video data is the second video format, the video format of input video data is converted from the second video format to the first video format. In this case, as shown in FIG. 4(b), 3840 pixels are formed by cutting down both sides of the 4096 pixels in the horizontal direction.

The control unit 101 controls a conversion operation of the two video data in the video format conversion unit 104 on the basis of video format information of the two video data (mix inputs A and B) extracted by the cross-point unit 103.

Figure 5:
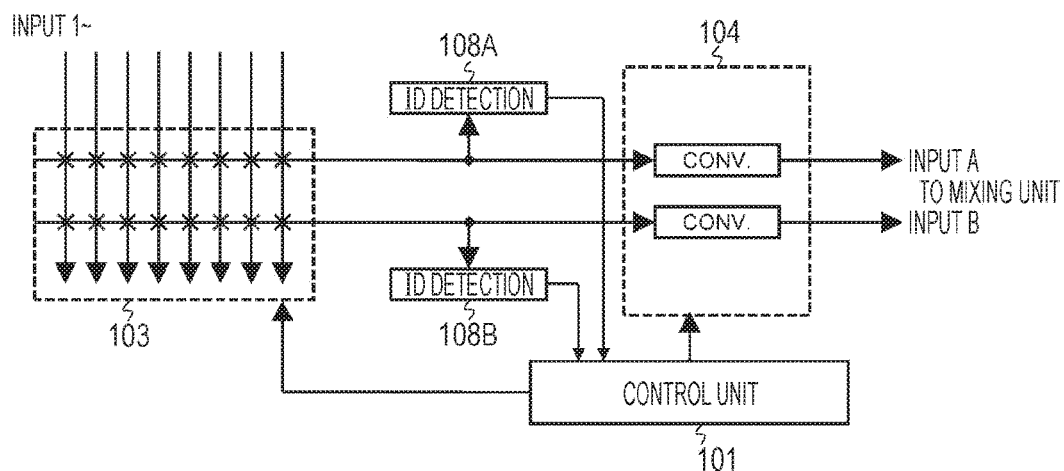
FIG. 5 is a diagram for explaining an example of detecting video format information of two video data (input A and input B) extracted at a cross-point unit from the video data.

For example, as shown in FIG. 5, the control unit 101 acquires the video format information of the two video data from detection units 108A and 108B that detect video formats of the two video data. Here, the detection units 108A and 108B detect identifiers (IDs) added to the two video data selected by the cross-point unit 103 as the video format information on a bus connected to the mixing unit 105 and transmits the identifiers (IDs) to the control unit 101.

In the case of this configuration, it is possible to immediately switch operation of the video format conversion unit 105 according to switching of video data in the cross-point unit 103. Further, in the case of this configuration, it is not necessary to detect all video formats of a plurality of video data inputted into the cross-point unit 103.

Furthermore, for example, the control unit 101 acquires the video format information of the two video data (input A and input B) extracted by the cross-point unit 103 from a table having each piece of video format information of a plurality of video data inputted into the cross-point unit 103. In this case, the control unit 101 holds the table. The table is caused to hold each piece of video format information of the plurality of video data by, for example, a first method, a second method, and a third method described below.

"First Method"

Figure 6:
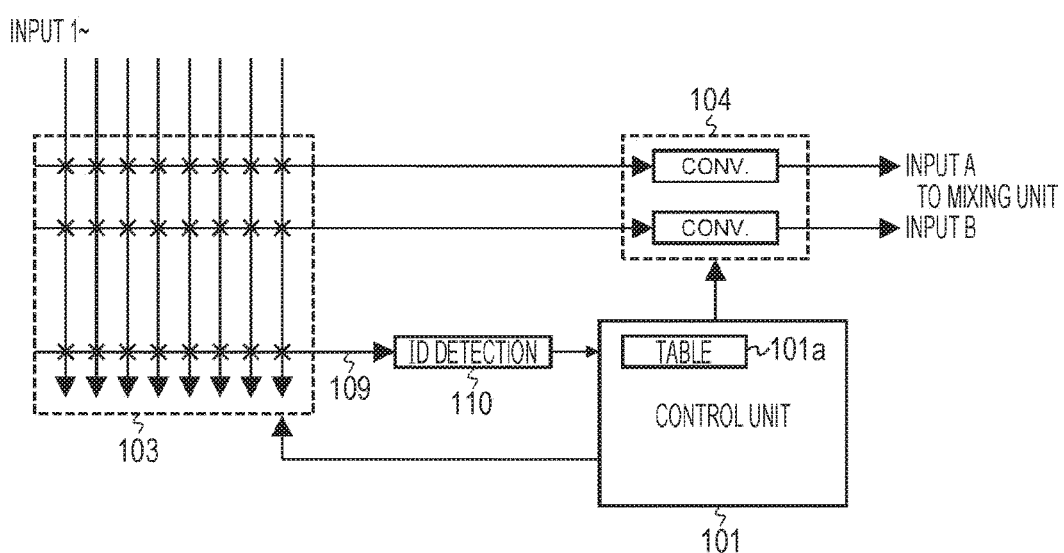
FIG. 6 is a diagram for explaining a table generation example in a case of obtaining the video format information of two video data (input A and input B) extracted at the cross-point unit from a table.

As shown in FIG. 6, a detection-dedicated bus 109 and a detection unit 110 are provided besides the buses connected to the mixing unit 105. Then, a cross-point is sequentially switched so that a plurality of video data inputted into the cross-point unit 103 are sequentially outputted to the bus 109. The detection unit 110 detects the identifier (ID) added to each video data as the video format information and transmits the identifier (ID) to the control unit 101.

The control unit 101 causes a table 101a to hold the video format information of each of the plurality of video data inputted into the cross-point unit 103 on the basis of the identifier (ID) of each video data transmitted from the detection unit 110. Basically, the table 101a is created before being used. However, even while the table 101a is being used, detection by the detection unit 110 and rewriting of the table 101a are performed. In the case of the first method, only one detection unit 110 needs to be provided.

Figures 7, 8:
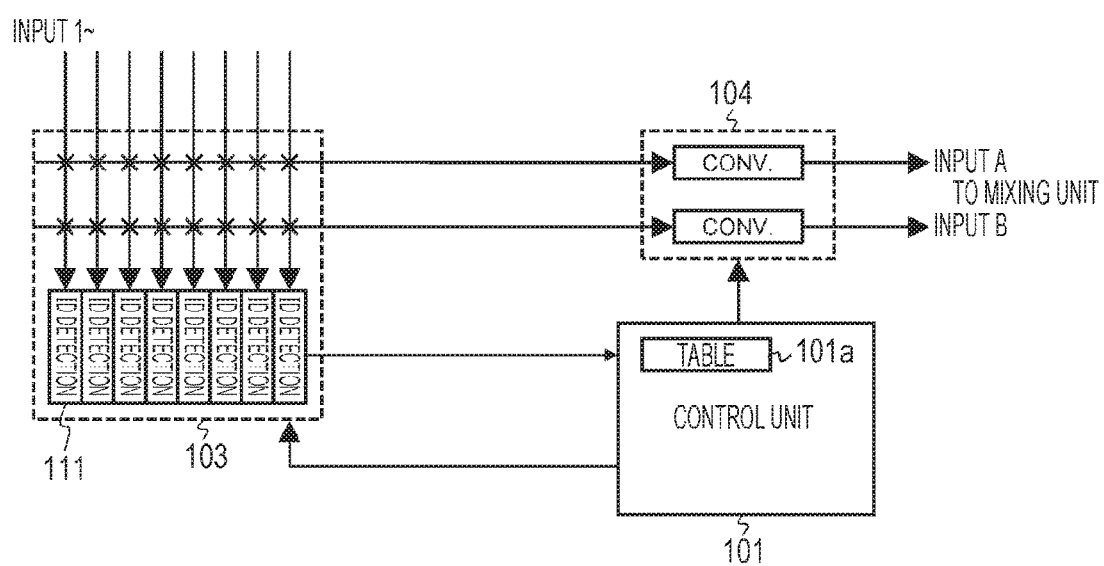
FIG. 7 is a diagram showing an example of the table.
FIG. 8 is a diagram for explaining a table generation example in a case of obtaining the video format information of two video data (input A and input B) extracted at the cross-point unit from a table.

FIG. 7 shows an example of the table 101a in the case of the first method. This example shows a case in which the number of video data inputted into the cross-point unit 103 is seven. The video format information held in the table 101a is considered to include, for example, no signal (No Signal), an unknown image size (Unknown), and a different format such as SD in addition to image sizes in the horizontal direction. Note that items other than the image size in the horizontal direction may be defined as Not Available (N/A).

"Second Method"

As shown in FIG. 8, a plurality of detection units 111 are provided in the cross-point unit 103 corresponding to each of a plurality of video data to be inputted. The detection unit 111 detects the identifier (ID) added to the video data as the video format information and transmits the identifier (ID) to the control unit 101. The control unit 101 causes the table 101a to hold the video format information of each of a plurality of video data inputted into the cross-point unit 103 on the basis of the identifier (ID) of each video data transmitted from the plurality of detection units 111.

Basically, the table 101a is created before being used. However, even while the table 101a is being used, detection by the detection unit 111 and rewriting of the table 101a are performed. In the case of the second method, the video format information held in the table 101a is similar to that in the case of the first method described above (see FIG. 7). In the case of the second method, when the video data is switched by a router or the like on the upstream side of the cross-point unit 103, the rewriting of the table 101a is immediately performed.

"Third Method"

As shown in FIG. 9, the detection unit that detects the identifier (ID) added to the video data is not provided. In the case of the third method, an image size corresponding to each of a plurality of video data inputted into the cross-point unit 103 is inputted manually by a user from the operation unit 102. The control unit 101 causes the table 101a to hold the video format information of each of the plurality of video data inputted into the cross-point unit 103 on the basis of this input information. Basically, when a system is installed, the image size of each of the plurality of video data inputted into the cross-point unit 103 is specified.

FIG. 10 shows an example of the table 101a in the case of the third method. This example shows a case in which the number of video data inputted into the cross-point unit 103 is seven. The video format information held in the table 101a is defined as, for example, Not Available (N/A) besides the image sizes in the horizontal direction.

Let us return to FIG. 1. The video format conversion unit 107 is arranged on the output side of the mixing unit 105. The video format conversion unit 107 makes the video format of the output video data obtained by the mixing unit 105 the same as the output video format. The output video format is the first video format or the second video format. For example, the output video format is set by the control unit 101 on the basis of a specification input by a user from the operation unit 102.

Here, when the video format handled by the mixing unit 105 and the output video format are the same, no conversion processing is performed on the output video data obtained by the mixing unit 105 and the output video data is outputted without change.

Further, when the video format handled by the mixing unit 105 is the first video format and the output video format is the second video format, the video format of the output video data obtained by the mixing unit 105 is converted from the first video format to the second video format. In this case, 4096 pixels are formed by adding other pixels to both sides of the 3840 pixels in the horizontal direction (see FIG. 4(*a*)).

Further, when the video format handled by the mixing unit 105 is the second video format and the output video format is the first video format, the video format of the output video data is converted from the second video format to the first video format. In this case, 3840 pixels are formed by cutting down both sides of the 4096 pixels in the horizontal direction (see FIG. 4(*b*)).

FIG. 11 is a diagram showing an example of video format conversion in a case in which the video format handled by the mixing unit 105 is the first video format, that is, in a case in which the mixing unit 105 is 3840-operation. One of the two video data extracted from the cross-point unit 103 is the first video format (3840*2160) and the other is the second video format (4096*2160).

The video data of the first video format is not converted by the video format conversion unit 104 and is supplied as is to the mixing unit 105 and the video data of the second video format is converted into the first video format by the video format conversion unit 104 and then supplied to the mixing unit 105. Then, in the mixing unit 105, two video data are mixed by wipe. The example shown in FIG. 11 shows a case in which the wipe is 16:9.

When the output video format is the second video format, other pixels are added to both sides of the output video data obtained by the mixing unit 105 by the video format conversion unit 107, so that the output video data is converted into the second video format and is outputted as an output A (4096). On the other hand, when the output video format is the first video format, the output video data obtained by the mixing unit 105 is not converted by the video format conversion unit 107 and is outputted as an output B (3840) without change.

Figure 12:
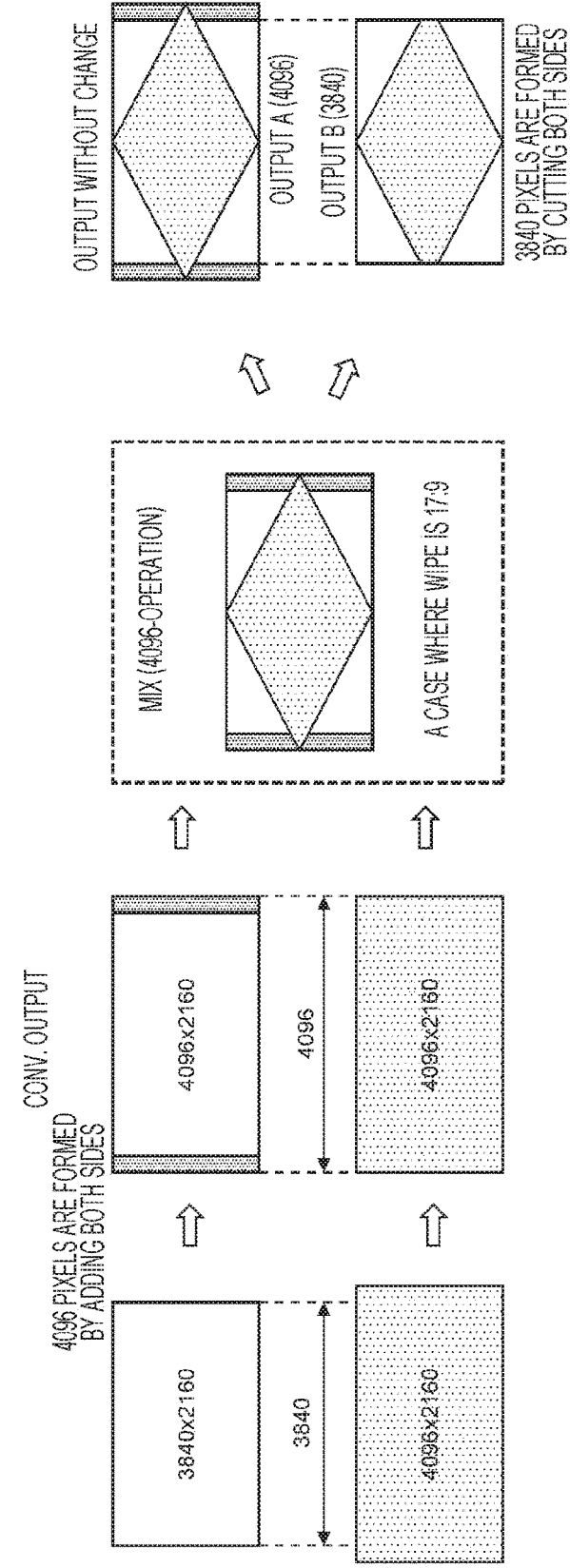
FIG. 12 is a diagram showing an example of video format conversion in a case in which the mixing unit mixing unit is 4096-operation.

FIG. 12 is a diagram showing an example of video format conversion in a case in which the video format handled by the mixing unit 105 is the second video format, that is, in a case in which the mixing unit 105 is 4096-operation. One of the two video data extracted from the cross-point unit 103 is the first video format (3840*2160) and the other is the second video format (4096*2160).

The video data of the second video format is not converted by the video format conversion unit 104 and is supplied as is to the mixing unit 105 and the video data of the first video format is converted into the second video format by the video format conversion unit 104 and then supplied to the mixing unit 105. Then, in the mixing unit 105, two video data are mixed by wipe. The example shown in FIG. 12 shows a case in which the wipe is 17:9.

When the output video format is the second video format, the output video data obtained by the mixing unit 105 is not converted by the video format conversion unit 107 and is outputted as an output A (4096) without change. On the other hand, when the output video format is the first video format, both sides of the output video data obtained by the mixing unit 105 are cut by the video format conversion unit 107, so that the output video data is converted into the first video format and is outputted as an output B (3840).

Let us return to FIG. 1. The wipe generation circuit 106 generates a wipe signal as the transition signal T described above (see FIGS. 2 and 3) on the basis of the wipe control signal supplied from the control unit 101 and transmits the wipe signal to the mixing unit 105.

Figure 13:
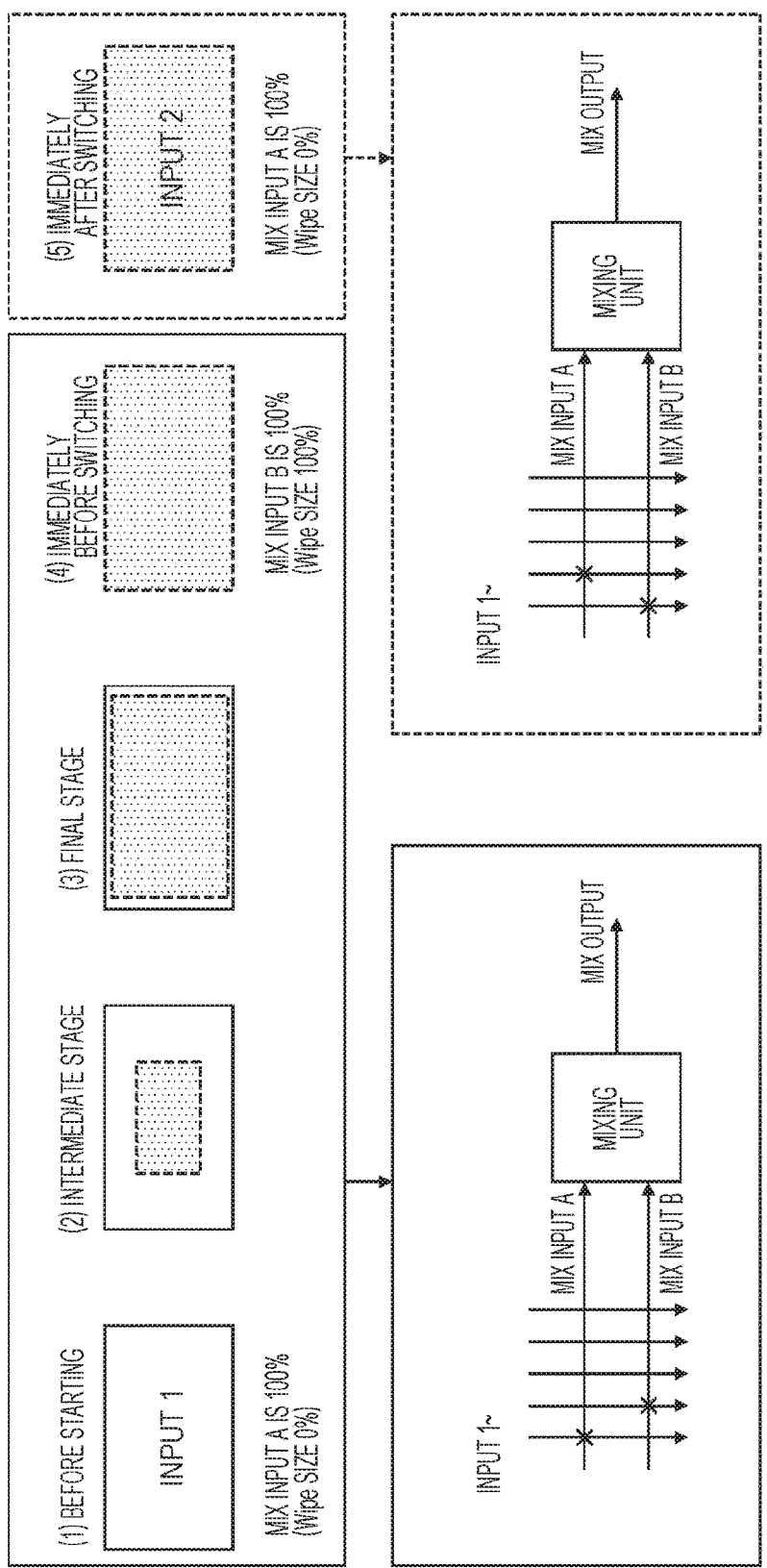
FIG. 13 is a diagram showing an overview of a cross-point and a control of mixing during transition.

FIG. 13 shows an overview of a cross-point and a control of mixing during transition. The transition means a scene change. In the example shown in FIG. 13, a state of input 1 is switched to input 2 by a rectangular wipe. When the transition ends, a swap in the cross-point and the transition (the size of wipe) are controlled at the same time so that switching from (4) to (5) is not perceived. A state (1) before starting and a state (5) immediately after switching are the same state in a point that the mix input A 100% is outputted. However, they are different in a point that signals transmitted to the mix inputs A and B in the cross-point are swapped.

Figure 14:
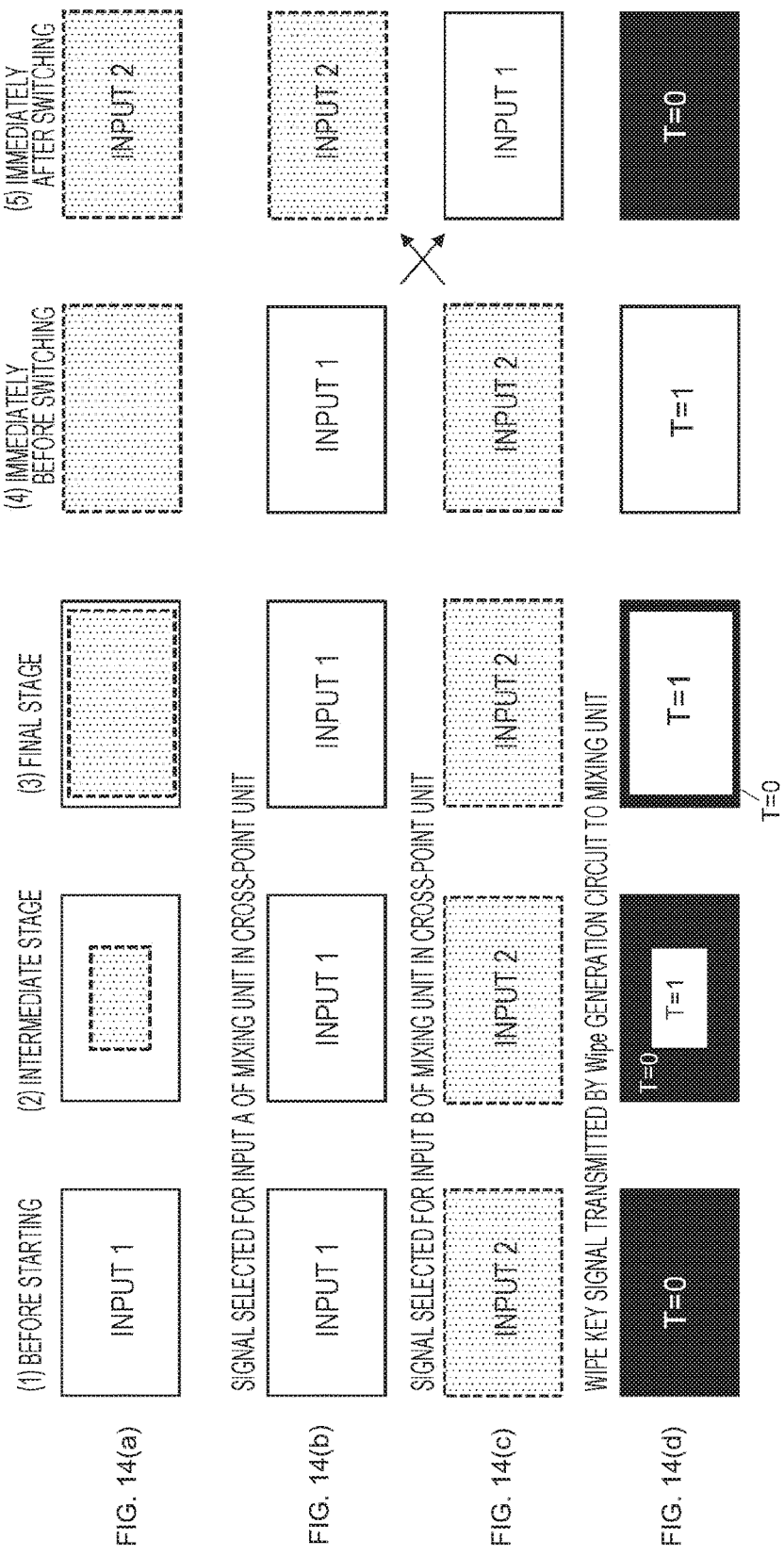
FIGS. 14(a) to 14(d) are diagrams showing an overview of a cross-point and a control of mixing during transition.

FIGS. 14(*a*) to 14(*d*) also show an overview of a cross-point and a control of mixing during transition corresponding to the example of FIG. 13. FIG. 14(*a*) shows an output of the mixing unit 105. Further, FIG. 14(*b*) shows a signal selected for the mix input A in the cross-point unit 103 and FIG. 14(*c*) shows a signal selected for the mix input B in the cross-point unit 103. Further, FIG. 14(*d*) shows the wipe signal (the transition signal T) that the wipe generation circuit 106 transmits to the mixing unit 105.

Figure 15:
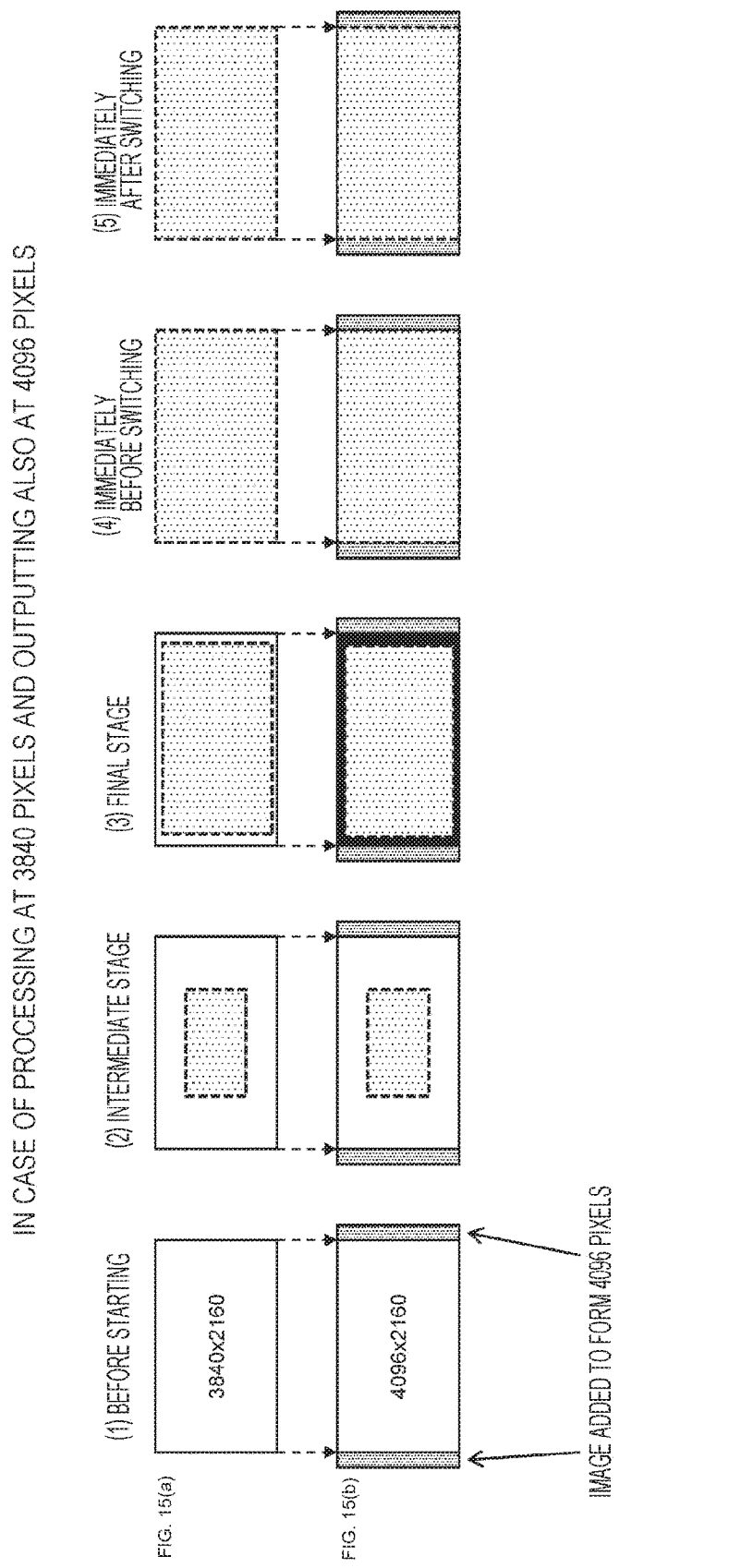
FIGS. 15(a) and 15(b) are diagrams for explaining a wipe control in a case in which the mixing unit handles the first video format (3840 pixels).

When the mixing unit 105 uses the first video format, the wipe control of the control unit 101 is performed so that the wipe control transits within a range of 3840-size having a shape of 16:9 (3840 native). In other words, the wipe signal is generated according to a 3840-area in an aspect ratio of 16:9. FIG. 15(*a*) shows an operation of the mixing unit 105 and an output signal in the first video format (3840 pixels) in the above case. Further, FIG. 15(*b*) shows an output signal in the second video format (4096 pixels) in the above case.

In this case, the wipe is operated in an area of 16:9, so that there is no problem for the 3840-pixel-output. Further, the 4096-pixel-output has a form where another image is added to both sides of the 3840-pixel-output, so that the 4096-pixel-output does not cause a feeling of strangeness.

When the mixing unit 105 uses the second video format, the wipe control of the control unit 101 is performed by any one of the first method, the second method, and the third method described below. The control unit 101 sets any one of the methods on the basis of a selection operation of a user from the operation unit 102.

"First Method"

Figure 16:
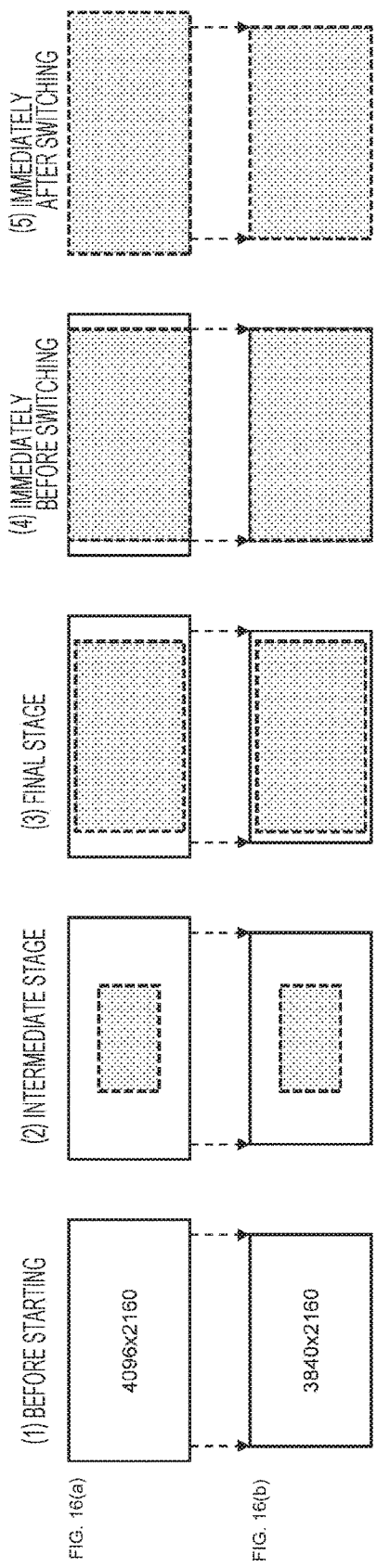
FIGS. 16(a) and 16(b) are diagrams for explaining an example (1) of a wipe control in a case in which the mixing unit handles the second video format (4096 pixels).

In the case of the first method, the wipe control of the control unit 101 is performed so that the wipe control transits within a range of 3840-size having a shape of 16:9 (3840 prioritized). In other words, the wipe signal is generated according to a 3840-area in an aspect ratio of 16:9. FIG. 16(*a*) shows an operation of the mixing unit 105 and an output signal in the second video format (4096 pixels) in the above case. Further, FIG. 16(*b*) shows an output signal in the first video format (3840 pixels) in the above case.

In this case, the wipe is operated in an area of 16:9, so that there is no problem for the 3840-pixel-output. However, in the 4096-pixel-output, the screen is switched before the wipe reaches the ends of the screen, so that there is some feeling of strangeness. The longer the transition time and the more slowly the wipe moves, the more noticeable the feeling of strangeness.

"Second Method"

Figure 17:
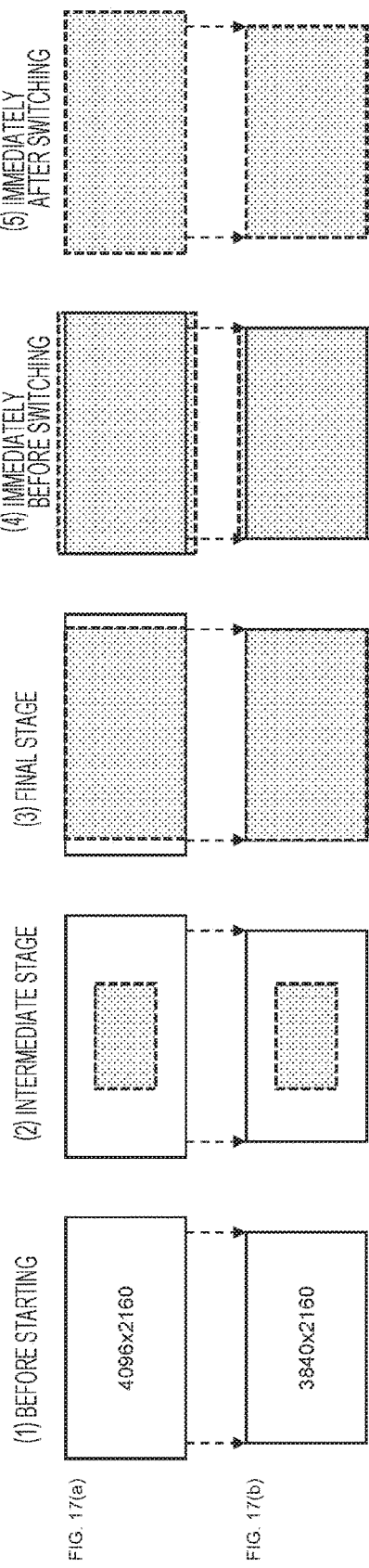
FIGS. 17(a) and 17(b) are diagrams for explaining an example (2) of a wipe control in a case in which the mixing unit handles the second video format (4096 pixels).

In the case of the second method, the wipe control of the control unit 101 is performed so that the wipe control transits within a range of 4096-size having a shape of 16:9 (both satisfied). In other words, the wipe signal is generated according to a 4096-area in an aspect ratio of 16:9. FIG. 17(*a*) shows an operation of the mixing unit 105 and an output signal in the second video format (4096 pixels) in the above case. Further, FIG. 17(*b*) shows an output signal in the first video format (3840 pixels) in the above case.

In this case, in the 4096-pixel-output, the aspect ratios of the wipe and the screen are different, so that when the wipe becomes large (in particular, when the wipe is rectangular in case (3)), there is a feeling of strangeness. The longer the transition time and the more slowly the wipe moves, the more noticeable the feeling of strangeness. In the 3840-pixel-output, the screen switches without a particular feeling of strangeness.

"Third Method"

Figure 18:
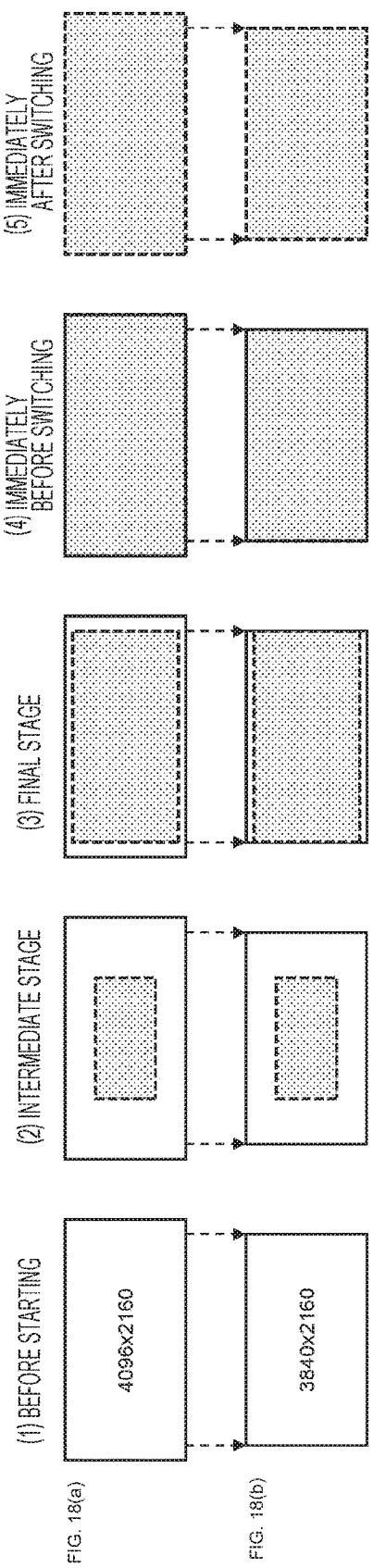
FIGS. 18(a) and 18(b) are diagrams for explaining an example (3) of a wipe control in a case in which the mixing unit handles the second video format (4096 pixels).

In the case of the third method, the wipe control of the control unit 101 is performed so that the wipe control transits within a range of 4096-size having a shape of 17:9 (to be exact, 17.0667:9) (4096 native). In other words, the wipe signal is generated according to a 4096-area in an aspect ratio of 17:9. FIG. 18(*a*) shows an operation of the mixing unit 105 and an output signal in the second video format (4096 pixels) in the above case. Further, FIG. 18(*b*) shows an output signal in the first video format (3840 pixels) in the above case.

In this case, in the 3840-pixel-output, the aspect ratios of the wipe and the screen are different, so that when the wipe becomes large (in particular, when the wipe is rectangular in case (3)), there is a feeling of strangeness. The longer the transition time and the more slowly the wipe moves, the more noticeable the feeling of strangeness. In the 4096-pixel-output, the screen switches without a particular feeling of strangeness.

An operation of the video data processing device 100 shown in FIG. 1 will be briefly described. A plurality of 4K video data is inputted into the cross-point unit 103 as video data to be selected. In the cross-point unit 103, two video data to be mixed are selectively extracted. The two video data are transmitted to the mixing unit 105 as the mix inputs A and B through the video format conversion unit 104.

In this case, in the video format conversion unit 104, the video format of the two video data is made the same as the video format handled by the mixing unit 105.

The wipe signal (the transition signal T) is supplied to the mixing unit 105 from the wipe generation circuit 106. In the mixing unit 105, two video data (mix inputs A and B) are mixed by wipe according to the wipe signal and output video data is obtained. The output video data is outputted through the video format conversion unit 107. In this case, in the video format conversion unit 107, the video format of the output video data is made the same as, for example, an output video format specified by a user.

In this case, either or both of video data of the first video format (3840 pixels) and video data of the second video format (4096 pixels) are outputted from the video format conversion unit 107.

As described above, in the video data processing device 100 shown in FIG. 1, when the two video data (mix inputs A and B) are mixed in the mixing unit 105, the video format of the two video data is made the same as the video format handled by the mixing unit 105. Therefore, even when mixing video data whose video formats are different, it is possible to perform appropriate mix processing.

Further, in the video data processing device 100 shown in FIG. 1, it is possible to arbitrarily select the first video format (3840 pixels) or the second video format (406 pixels) as the video format handled by the mixing unit 105. Therefore, it is possible to obtain appropriate video data as the output video data.

Figure 19:
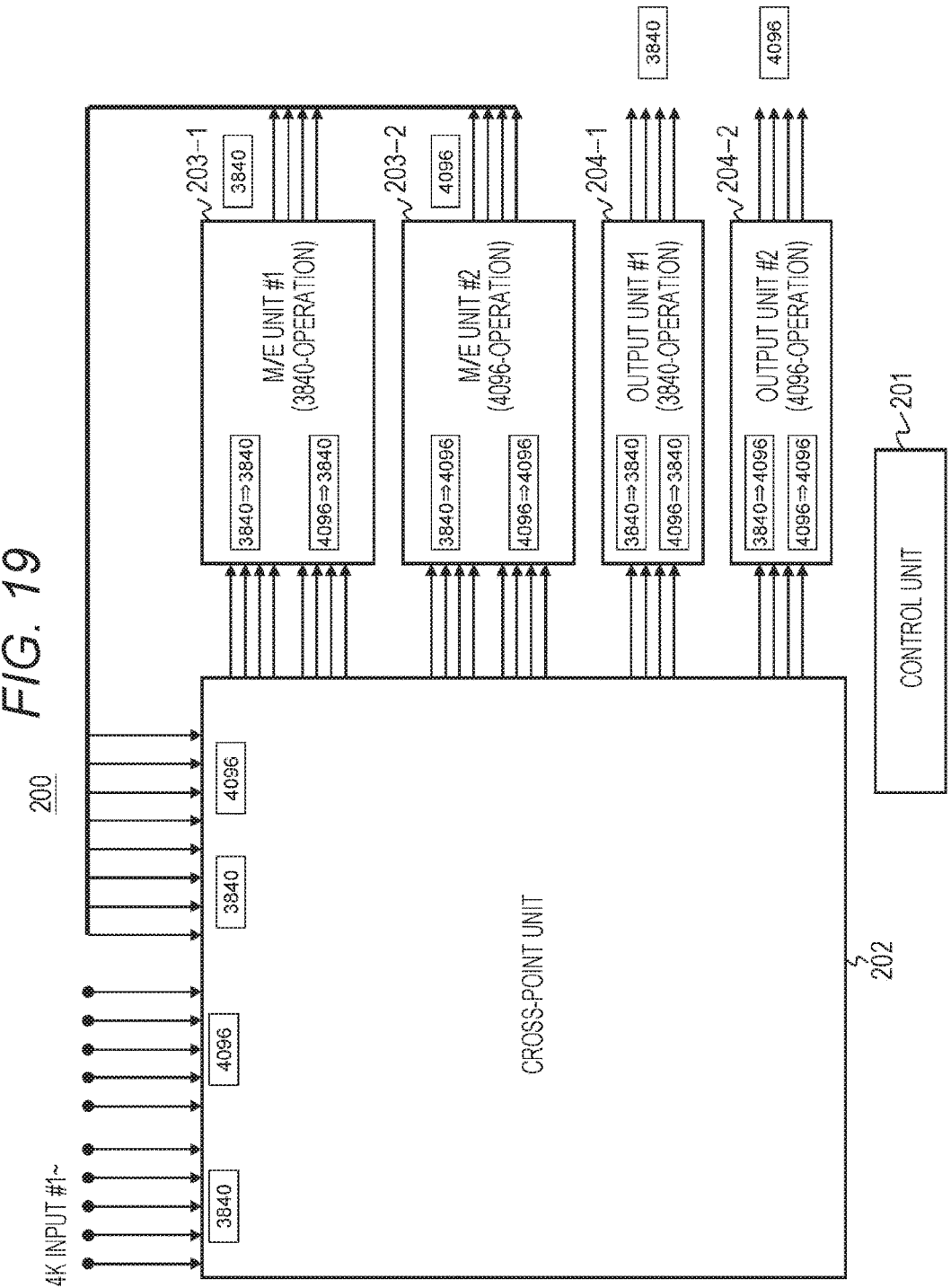
FIG. 19 is a block diagram showing a configuration example of a switcher to which the video data processing device of the present technology can be applied.

FIG. 19 shows a configuration example of a switcher 200 to which the video data processing device of the present technology can be applied. The switcher 200 has a control unit 201, a cross-point unit 202, M/E units 203-1 and 203-2, and output units 204-1 and 204-2.

The control unit 201 controls an operation of each unit of the switcher 200. Specifically, the control unit 201 performs switching of cross-point of the cross-point unit 202, transition control including wipe operation of the M/E units 203-1 and 203-2, key signal generation circuit control and synthesis control of the M/E units 203-1 and 203-2, and control of the output units 204-1 and 204-2.

The cross-point unit 202 extracts input video data of the M/E units 203-1 and 203-2 and input video data of the output units 204-1 and 204-2 from a plurality of 4K video data. The output units 204-1 and 204-2 include a video format conversion unit and output 4K video data from the cross-point unit 202 in accordance with a specified video format. In the example shown in FIG. 19, the output unit 204-1 outputs video data of the first video format (3840 pixels) and the output unit 204-2 outputs video data of the second video format (4096 pixels).

The M/E units 203-1 and 203-2 have two or more 4K inputs and one or more 4K output. In the example shown in FIG. 19, the M/E unit 203-1 outputs video data of the first video format (3840 pixels) and the M/E unit 203-2 outputs video data of the second video format (4096 pixels).

Figure 20:
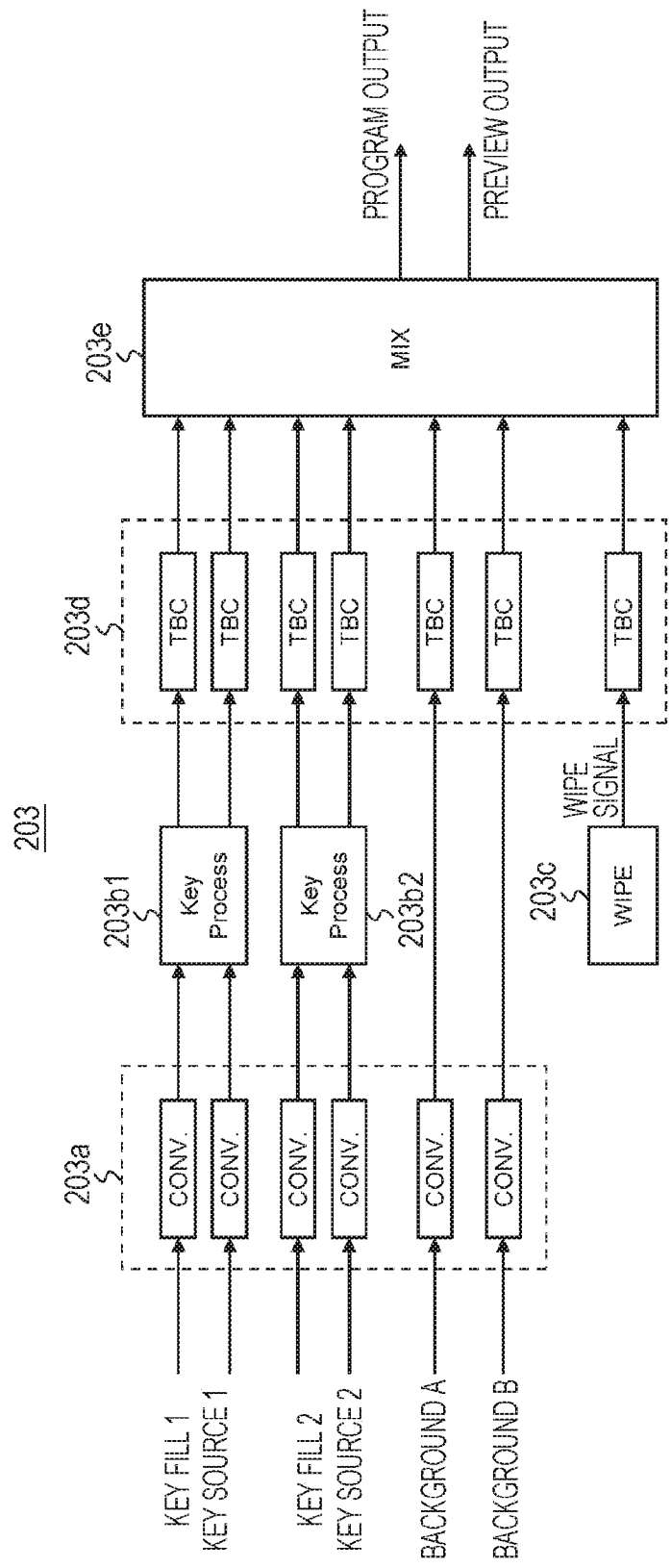
FIG. 20 is a block diagram showing a configuration example of an M/E unit.

FIG. 20 shows a configuration example of an M/E unit 203 (203-1, 203-2). The M/E unit 203 has a conversion unit 203*a* that converts key fill signals 1 and 2, key source signals 1 and 2, and background signals A and B, which are input video data, into a specified video format (a specified number of pixels).

Further, the M/E unit 203 has key processors 203*b*1 and 203*b*2 that adjusts and processes the key fill signals 1 and 2 and the key source signals 1 and 2, a wipe generation circuit 203*c* that generates a wipe signal corresponding to the specified number of pixels, and a time base collector 203*d* for performing phase matching between signals, that is, between an image to be synthesized and a key signal. Further, the M/E unit 203 has a mixing unit 203*e* that superimposes a foreground image on a background image by keying by using the key fill signals 1 and 2 and the key source signals 1 and 2 and performs a program output and a preview output corresponding to the specified number of pixels by performing transition of the background image on the basis of the wipe signal.

2. Modified Example

Figure 21:
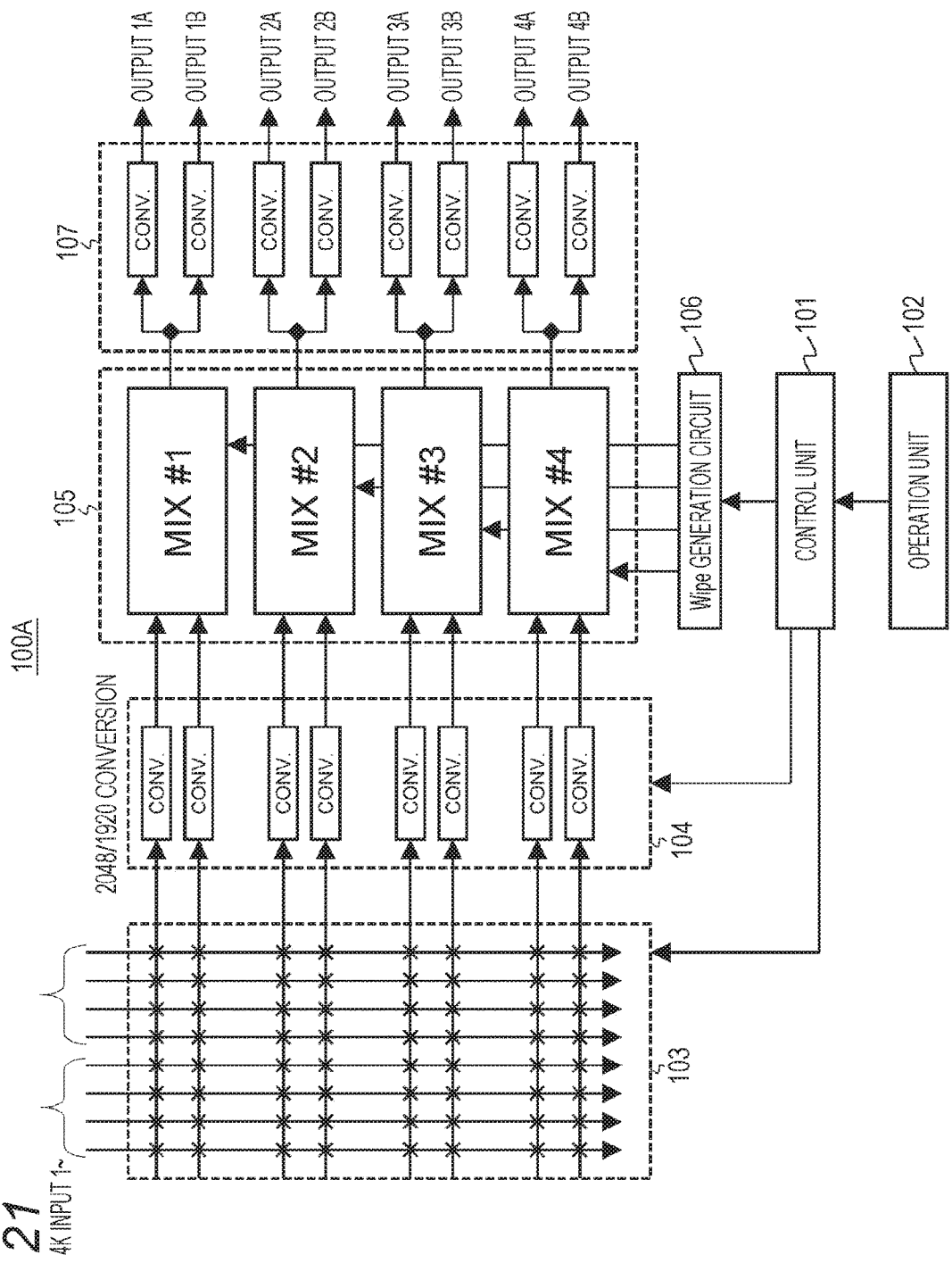
FIG. 21 is a block diagram showing another configuration example of the video data processing device.

In addition, although not described above, even when the video data is four-divided 4K mode video data, it is possible to configure in a similar manner to the above embodiment. FIG. 21 shows a configuration example of a video data processing device 100A in the above case. In FIG. 21, portions corresponding to those in FIG. 1 are denoted by the same reference symbols.

Here, the four-divided 4K mode video data will be described. As standards of the video data, for example, a Square Division standard and a 2-Sample Interleave Division standard are known.

Figure 22A:
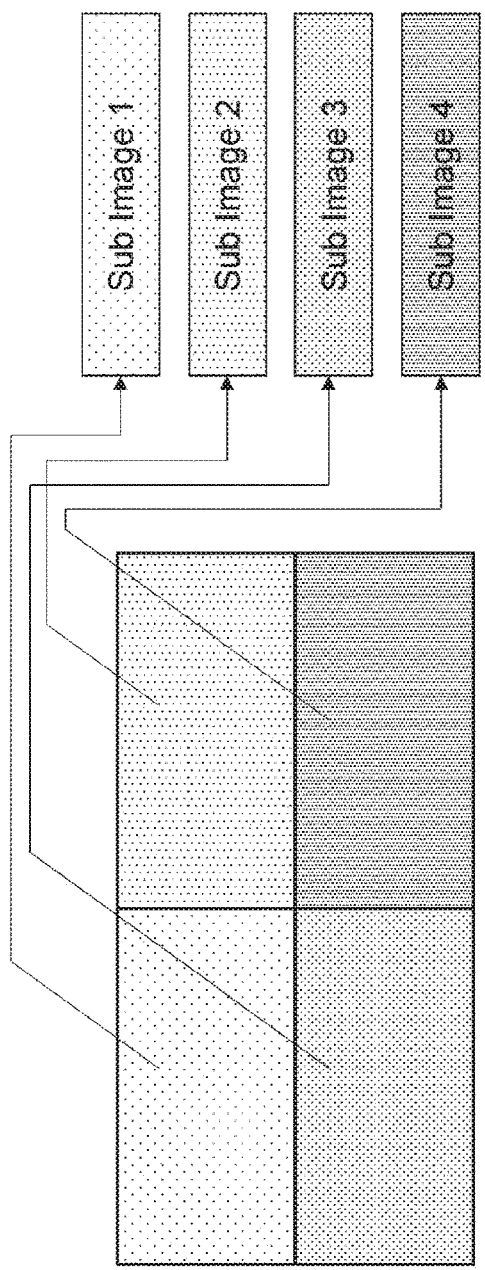
FIGS. 22(a) and 22(b) are diagrams for explaining a Square Division standard and a 2-Sample Interleave Division standard that are standards of four-divided 4K mode video data.

First, the Square Division standard will be described. In the case of the Square Division standard, as shown in FIG. 22(a), a 4K video frame is horizontally and vertically divided into two equal parts, so that four divided video frames, that is, sub images 1 to 4, are obtained.

Figure 22B:
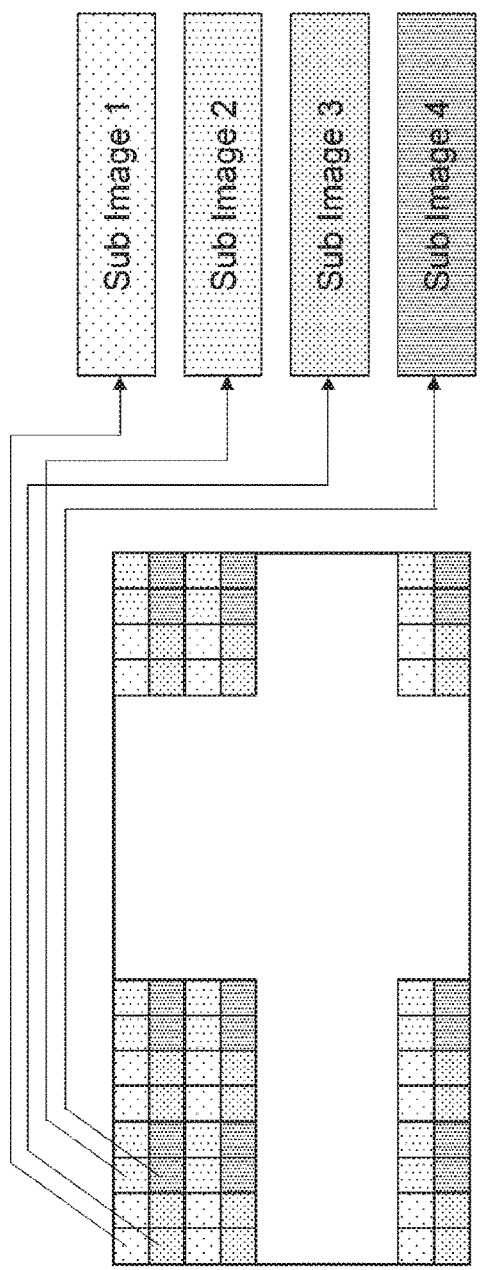

Next, the 2-Sample Interleave Division standard will be described. In the case of the 2-Sample Interleave Division standard, as shown in FIG. 22(b), sets of two pixels (two samples) are alternately extracted in even-numbered lines, so that two divided video frames, that is, sub images 1 and 2, are obtained. Further, in the case of the 2-Sample Interleave Division standard, sets of two pixels (two samples) are alternately extracted in odd-numbered lines, so that two divided video frames, that is, sub images 3 and 4, are obtained.

In the video format conversion unit 104, the mixing unit 105, and the video format conversion unit 107 of the video data processing device 100A shown in FIG. 21, video data of each of the four sub images that form four-divided 4K mode video data is independently processed.

Figures 23A, 23B:
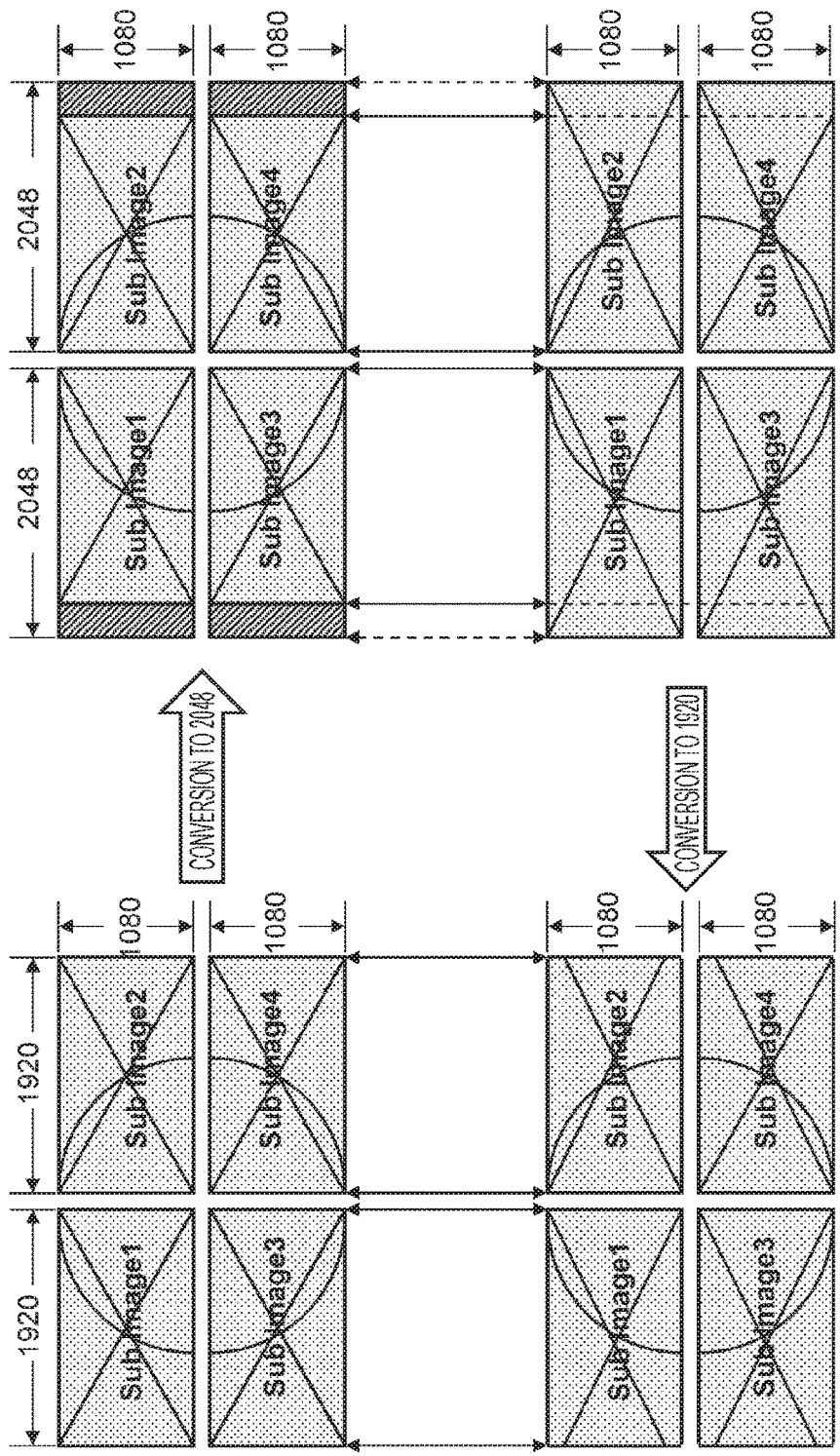
FIGS. 23(a) and 23(b) are diagrams for explaining conversion processing of video format between the first video format (3840 pixels) and the second video format (4096 pixels) in a case of the Square Division standard.

FIGS. 23(a) and 23(b) show an overview of conversion of the number of pixels between the first video format (3840 pixels) and the second video format (4096 pixels) in a case in which the video data is the Square Division standard. When the first video format (3840 pixels) is converted to the second video format (4096 pixels), as shown in FIG. 23(a), regarding the sub images 1 and 3, 2048 pixels are formed by adding other pixels to the left side of the sub images 1 and 3, and regarding the sub images 2 and 4, 2048 pixels are formed by adding other pixels to the right side of the sub images 2 and 4.

Further, when the second video format (4096 pixels) is converted to the first video format (3840 pixels), as shown in FIG. 23(b), regarding the sub images 1 and 3, 1920 pixels are formed by cutting down the left side of the sub images 1 and 3, and regarding the sub images 2 and 4, 1920 pixels are formed by cutting down the right side of the sub images 2 and 4.

Figures 24A, 24B:
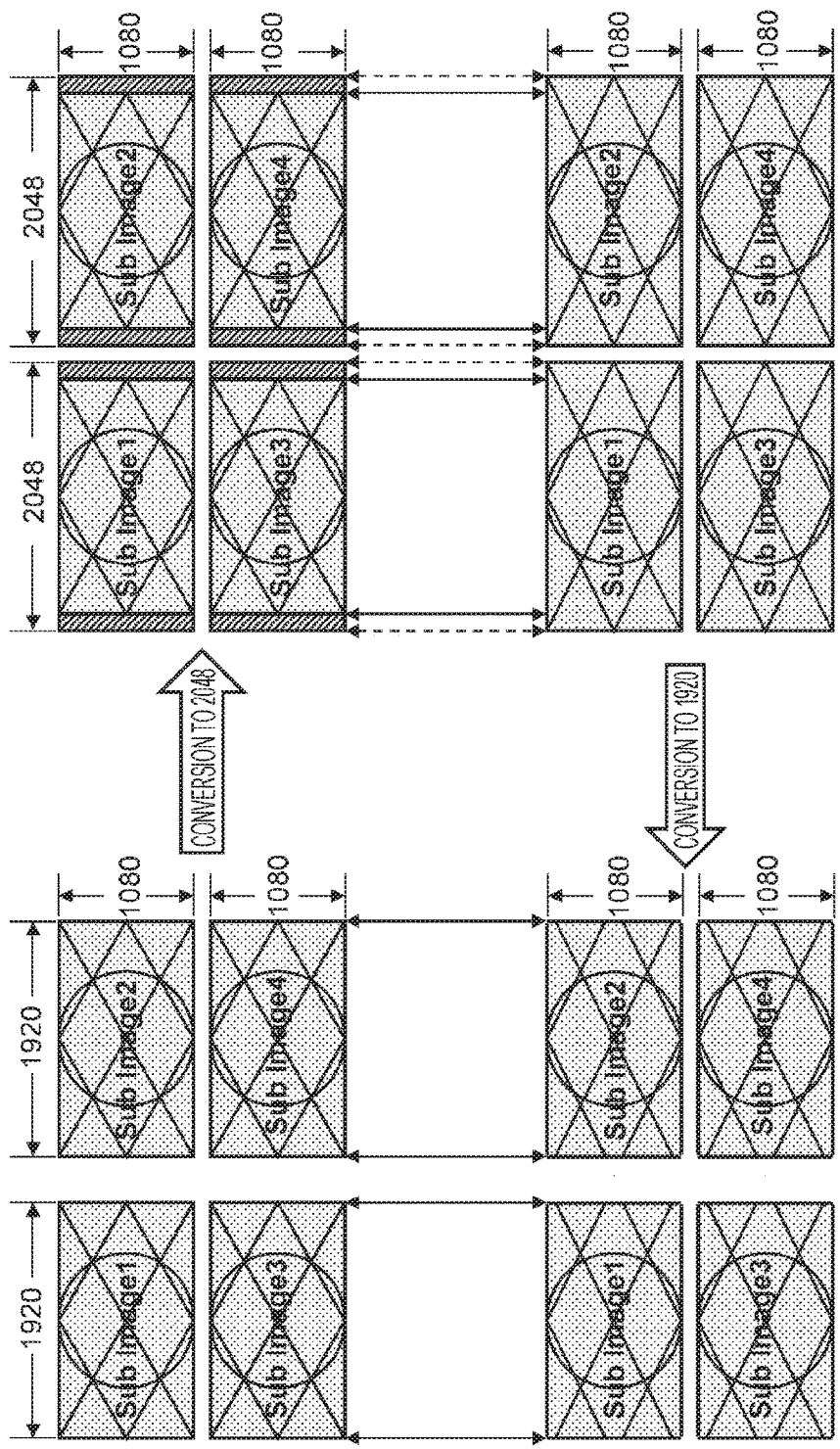
FIGS. 24(a) and 24(b) are diagrams for explaining conversion processing of video format between the first video format (3840 pixels) and the second video format (4096 pixels) in a case of the 2-Sample Interleave Division standard.

FIGS. 24(a) and 24(b) show an overview of conversion of the number of pixels between the first video format (3840 pixels) and the second video format (4096 pixels) in a case in which the video data is the 2-Sample Interleave Division standard. When the first video format (3840 pixels) is converted to the second video format (4096 pixels), as shown in FIG. 24(a), 2048 pixels are formed by adding other pixels to both sides of each sub image. Further, when the second video format (4096 pixels) is converted to the first video format (3840 pixels), as shown in FIG. 24(b), 1920 pixels are formed by cutting down both sides of each sub image.

FIG. 25 shows a basic structure of signals of 1125 lines used in sub images. In the case of 2048 pixels, a distance between EAV and SAV is smaller than that in the case of 1920 pixels by 128 (=2048−1920) samples. Further, although the example shown in FIG. 25 shows a case in which the video is 60 Hz, when the video is 50 Hz, the number of samples in one line is 2640 (=2200*1125*60)/(1125*50)), so that the distance between EAV and SAV increases.

A Payload ID that is an identifier (ID) indicating a video format is added to a tenth line. The video is switched at a seventh line (Switching Point), so that it is possible to detect the number of pixels of the video after the switching by reading the Payload ID in the tenth line. In addition, when there is no Payload ID or it is not possible to detect a Payload ID, the number of pixels can be detected by measuring the distance between EAV and SAV.

Further, the present technology can also employ configurations as described below.

(1) A video data processing device including:
a video data input unit that inputs first video data and second video data;
a mixing unit that mixes the first video data and the second video data inputted by the video data input unit and obtains output video data;
a first video format conversion unit that is arranged between the video data input unit and the mixing unit and that makes a video format of the first video data and the second video data inputted into the mixing unit the same as a video format handled by the mixing unit; and
a second video format conversion unit that is arranged on an output side of the mixing unit and that makes a video format of the output video data outputted from the mixing unit the same as an output video format.

(2) The video data processing device according to (1),
wherein the first video data and the second video data are respectively video data of a first video format where the number of vertical pixels is a first value and the number of horizontal pixels is a second value or a second video format where the number of vertical pixels is the first value and the number of horizontal pixels is a third value,
the mixing unit handles the first video format or the second video format, and
the output video format is the first video format or the second video format.

(3) The video data processing device according to (2),
wherein the first value is 2160, the second value is 3840, and the third value is 4096.

(4) The video data processing device according to (3),
wherein the video data is four-divided 4K mode video data.

(5) The video data processing device according to (3) or (4),
wherein the mixing unit mixes the first video data and the second video data by wipe.

(6) The video data processing device according to (5),
wherein when the mixing unit handles the first video format, wipe control transits within a range of 3840-size having a shape of 16:9.

(7) The video data processing device according to (5),
wherein when the mixing unit handles the second video format, wipe control transits within a range of 3840-size having a shape of 16:9, transits within a range of 4096-size having a shape of 16:9, or transits within a range of 4096-size having a shape of 17:9.

(8) The video data processing device according to any of (1) to (7), further including:
a control unit that controls conversion operation on the first video data and the second video data in the first video format conversion unit on the basis of video format information of each of the first video data and the second video data.

(9) The video data processing device according to (8),
wherein the control unit acquires the video format information of each of the first video data and the second video data from a detection unit that detects the video format of each of the first video data and the second video data.

(10) The video data processing device according to (8), wherein the video data input unit has a cross-point unit that selectively extracts the first video data and the second video data from a plurality of video data, and the control unit acquires the video format information of each of the first video data and the second video data from a table that has video format information of each of the plurality of video data.

(11) A video data processing method of obtaining output video data by performing mix processing on first video data and second video data, the video data processing method including the steps of:

before performing the mix processing, making a format of the first video data and the second video data the same as a video format handled by the mixing processing, and after performing the mix processing, making a format of the output video data the same as an output video format.

(12) A video data processing device including:

a video data input unit that inputs first video data and second video data;

a mixing unit that mixes the first video data and the second video data inputted by the video data input unit and obtains output video data; and a video format conversion unit that is arranged between the video data input unit and the mixing unit and that makes a video format of the first video data and the second video data inputted into the mixing unit the same as a video format handled by the mixing unit.

REFERENCE SIGNS LIST 100, 100A Video data processing device
101 Control unit
101a Table
102 Operation unit
103 Cross-point unit
104 Video format conversion unit
105 Mixing unit
105a Subtracter
105b Multiplier
105c Adder
106 Wipe generation circuit
107 Video format conversion unit
108A, 108B, 110, 111 Detection unit
109 Bus
200 Switcher
201 Control unit
202 Cross-point unit
203, 203-1, 203-2 M/E unit
203a Video format conversion unit
203b1, 203b2 Key processor
203c Wipe generation circuit
203d Time base collector
203e Mixing unit

The invention claimed is:

1. A video data processing device, comprising:
a video data input unit configured to input first video data and second video data;
a mixing unit configured to mix the first video data and the second video data based on a difference value between the first video data and the second video data and generate output video data;
a first video format conversion unit which is between the video data input unit and the mixing unit, and is configured to convert a first video format of the first video data and a second video format of the second video data into a video format handled by the mixing unit; and
a second video format conversion unit which is on an output side of the mixing unit and is configured to convert a third video format of the output video data outputted from the mixing unit into an output video format.

2. The video data processing device according to claim 1, wherein in the first video format a first number of vertical pixels is a first value and a second number of horizontal pixels is a second value,
wherein in the second video format a third number of vertical pixels is the first value and a fourth number of horizontal pixels is a third value,
wherein the mixing unit is further configured to handle one of the first video format or the second video format, and
wherein the output video format is one of the first video format or the second video format.

3. The video data processing device according to claim 2, wherein the first value is 2160, the second value is 3840, and the third value is 4096.

4. The video data processing device according to claim 3, wherein the video data is four-divided 4K mode video data.

5. The video data processing device according to claim 3, wherein the mixing unit is further configured to mix the first video data and the second video data by wipe.

6. The video data processing device according to claim 5, further comprising a control unit configured to control a transition of the wipe within a range of 3840-size based on the first video format, wherein the 3840-size has a shape of 16:9.

7. The video data processing device according to claim 5, further comprising a control unit configured to control a transition of the wipe within a range which is one of 3840-size that has a shape of 16:9, 4096-size that has a shape of 16:9, or 4096-size that has a shape of 17:9, wherein the control unit is further configured to control the transition based on the second video format.

8. The video data processing device according to claim 1, further comprising:
a control unit configured to control a conversion operation on the first video data and the second video data in the first video format conversion unit based on video format information of each of the first video data and the second video data.

9. The video data processing device according to claim 8, further comprising a detection unit configured to detect the video format information of each of the first video data and the second video data,
wherein the control unit is further configured to acquire the video format information of each of the first video data and the second video data from the detection unit.

10. The video data processing device according to claim 8,
wherein the video data input unit comprises a cross-point unit, wherein the cross-point unit is configured to extract the first video data and the second video data from a plurality of video data, and
wherein the control unit is further configured to acquire the video format information of each of the first video data and the second video data from a table, wherein the table comprises the video format information of each of the plurality of video data.

11. A video data processing method, comprising:
inputting first video data and second video data;
calculating a difference value between the first video data and the second video data;
converting a first format of the first video data and a second format of the second video data into a third video format,
mixing the first video data in the third video format and the second video data in the third video format based on the difference value;
generating output video data based on the mixed first video data and the second video data; and
converting a video format of the output video data same as an output video format.

12. A video data processing device, comprising:
a video data input unit configured to input first video data and second video data;
a mixing unit configured to mix the first video data and the second video data based on a difference value between the first video data and the second video data and generate output video data; and
a video format conversion unit which is between the video data input unit and the mixing unit, and is configured to convert a first video format of the first video data and a second video format of the second video data into a video format handled by the mixing unit.

* * * * *